(12) United States Patent
Boyd et al.

(10) Patent No.: US 6,270,135 B1
(45) Date of Patent: Aug. 7, 2001

(54) VACUUM COLLET WITH RELEASE WEIGHTS

(75) Inventors: John E. Boyd, Blandon; Jonathan V. Haggar, Fleetwood; John S. Fangman, Leesport; John S. Rizzo, Oley, all of PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/394,979

(22) Filed: Sep. 13, 1999

(51) Int. Cl.$^7$ ................................................ B25J 15/06
(52) U.S. Cl. ............................................................ 294/64.1
(58) Field of Search ................... 294/64.1–65; 414/627, 414/737, 752.1; 901/40

(56) References Cited

U.S. PATENT DOCUMENTS

| | | | |
|---|---|---|---|
| 4,650,233 | * | 3/1987 | Mang et al. .......................... 294/64.1 |
| 4,994,240 | * | 2/1991 | Hayashi ................................ 294/64.1 |
| 5,183,670 | * | 2/1993 | Trudeau .............................. 294/64.1 |
| 5,297,830 | * | 3/1994 | Hoke ...................................... 294/65 |
| 5,385,441 | * | 1/1995 | Swapp et al. ......................... 414/737 |
| 5,456,510 | * | 10/1995 | Coots et al. ......................... 294/64.1 |
| 5,938,211 | * | 8/1999 | Freund et al. ....................... 294/64.1 |
| 6,065,789 | * | 5/2000 | Nagai et al. ......................... 294/64.1 |

FOREIGN PATENT DOCUMENTS 1-203193 * 8/1989 (JP) ..................................... 294/64.1

OTHER PUBLICATIONS

Western Electric Technical Digest, No. 22, Apr. 1971.*

* cited by examiner

*Primary Examiner*—Dean J. Kramer
(74) *Attorney, Agent, or Firm*—Duane Morris & Heckscher LLP

(57) ABSTRACT

A vacuum collet includes at least one weight disposed in the collet for assisting in removal of components from the collet. The weights are movable within the collet to gently dislodge components lodged on a bottom face of the collet. The weights may be actuated by the same vacuum which draws components to the collet.

18 Claims, 6 Drawing Sheets

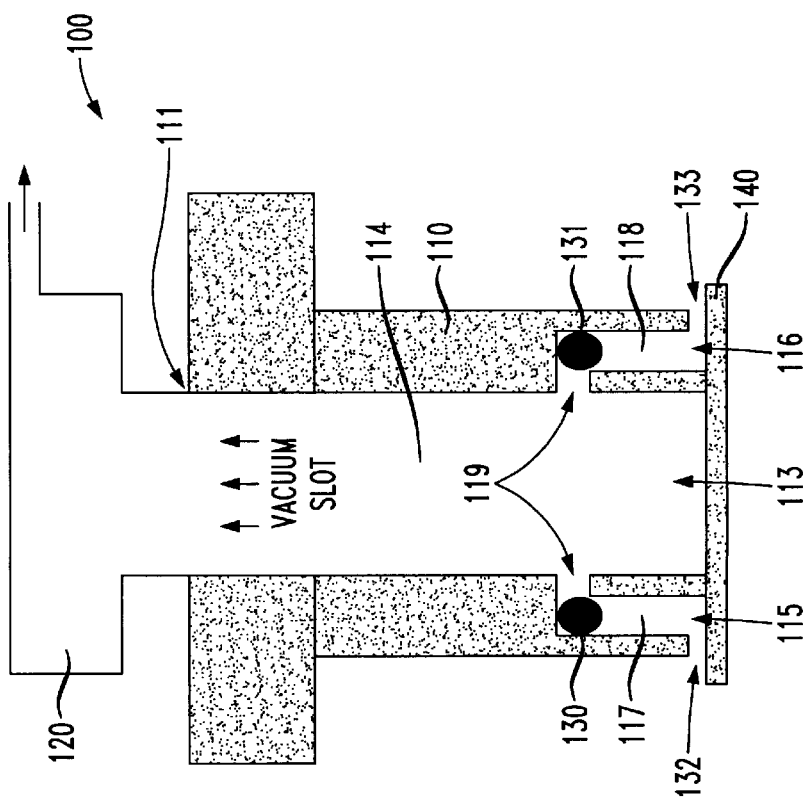
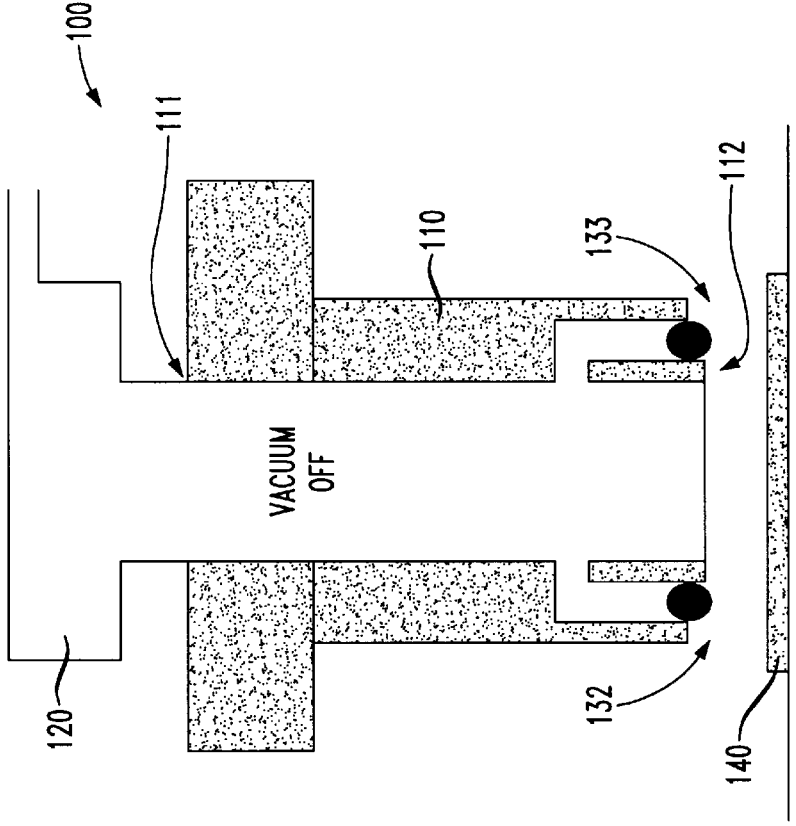

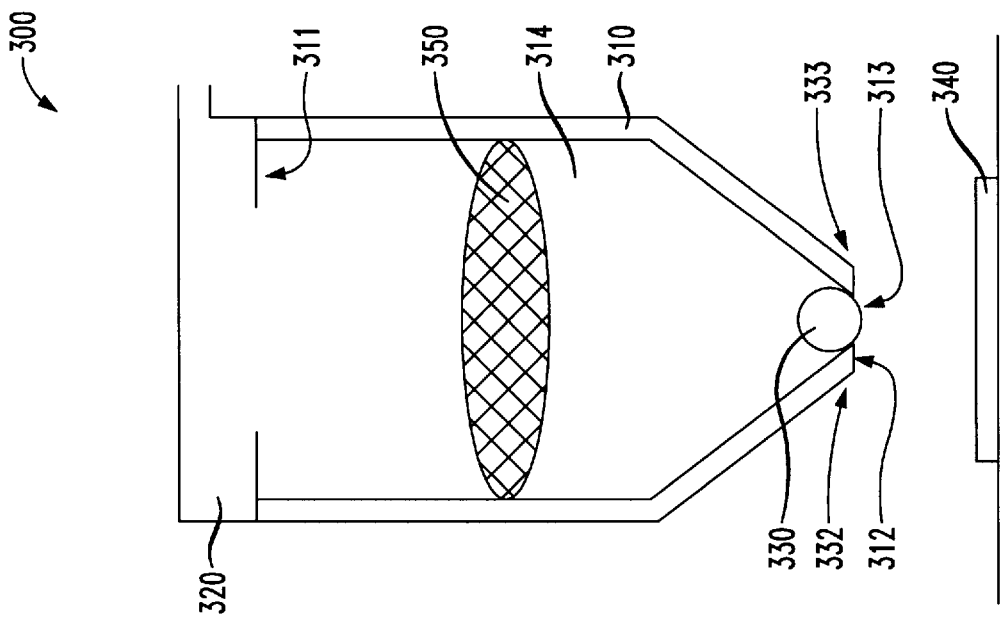
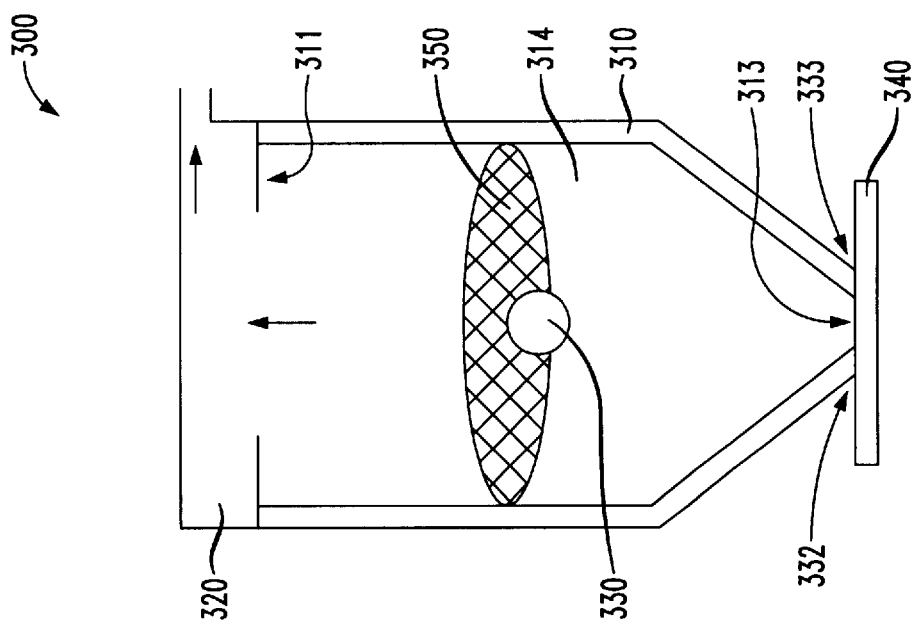

VACUUM COLLET WITH RELEASE WEIGHTS

FIELD OF THE INVENTION

The present invention relates to a vacuum collet for handling small components.

DESCRIPTION OF THE RELATED ART

During the production of certain semiconductor devices, it is often necessary to handle very small components. These components must be picked up and placed on the semiconductor devices accurately to ensure proper performance of the semiconductor devices. Currently, small components which are placed on semiconductor devices are picked and placed using an automated vacuum collet device. The collet device picks up the components from a production area, moves them to an area where the semiconductor devices are located, and places the components on the semiconductor devices. Examples of components transferred using a vacuum collet are laser bars and laser chips. Laser bars are elongate portions of laser material typically formed by cleaving a laser wafer. Laser chips are smaller portions of the laser bars, formed by cleaving the laser bar into small sections. Laser chips are used in semiconductor devices such as, for example, optical subassemblies (OSAs). An OSA uses the laser chip to project a laser beam towards a spherical lens which focuses the beam. When producing OSAs, both laser bars and laser chips must be accurately handled. The laser bars must be moved from an area where they are produced to an area where they are cleaved into a plurality of laser chips. The laser chips must then be moved from the area where they are produced to the surface of a substrate which forms the OSA. Currently, the picking and placing of the laser bars and laser chips is accomplished using a vacuum collet device. FIGS. 1(a) and 1(b) show a conventional vacuum collet device 10 including a vacuum collet 20 and an associated component 40 (e.g. laser bar, laser chip). The collet device 10 also includes a vacuum source 30 through which a vacuum is applied to the collet 20. FIG. 1(a) shows the collet 20 with no vacuum applied, and FIG. 1(b) shows the vacuum collet 20 with vacuum applied. The vacuum created within the collet 20 draws the component 40 toward a bottom surface 21 of the collet and holds the component there as long as the vacuum remains applied. When the vacuum is deactivated, the component 40 sometimes falls away from the bottom face 21 of the collet 20 on its own. Often, however, the component 40 remains stuck to the bottom face 21 of the collet 20. When this occurs, an operator must either remove the component 40 manually or activate a gas puff through the collet 20, in the direction opposite of the vacuum, which forces the component 20 away from the collet. The mechanism for producing the gas puff is not shown in FIGS. 1(a) and (b), however, it would typically be connected to the collet 20 through the same line as the vacuum. Removal of the components 20 manually can be very time-consuming. Further, removal by a gas puff has not always proven effective. The force of the gas puff often upsets other components in the area where the component being transferred is being placed.

Thus, there exists a need for a vacuum collet which allows easy and efficient removal of components from the collet.

SUMMARY OF THE INVENTION

The present invention is an apparatus for handling components which includes a vacuum tool and at least one weight disposed within the vacuum tool. The weight is movable within the vacuum tool to remove components from a face of the vacuum tool.

The above and other advantages and features of the present invention will be better understood from the following detailed description of the preferred embodiments of the invention which is provided in connection with the accompanying drawings.

BRIEF DESCRIPTION OF THE DRAWINGS

FIG. 2(a) shows a vacuum collet according to a first embodiment of the present invention with a laser component attached thereto.

FIG. 2(b) shows the vacuum collet of FIG. 2(a) with the laser component being removed.

FIG. 4(a) shows a vacuum collet according to a third embodiment of the present invention with a laser component attached thereto.

FIG. 4(b) shows the vacuum collet of FIG. 4(a) with the laser component being removed.

DETAILED DESCRIPTION

Figure 1B:
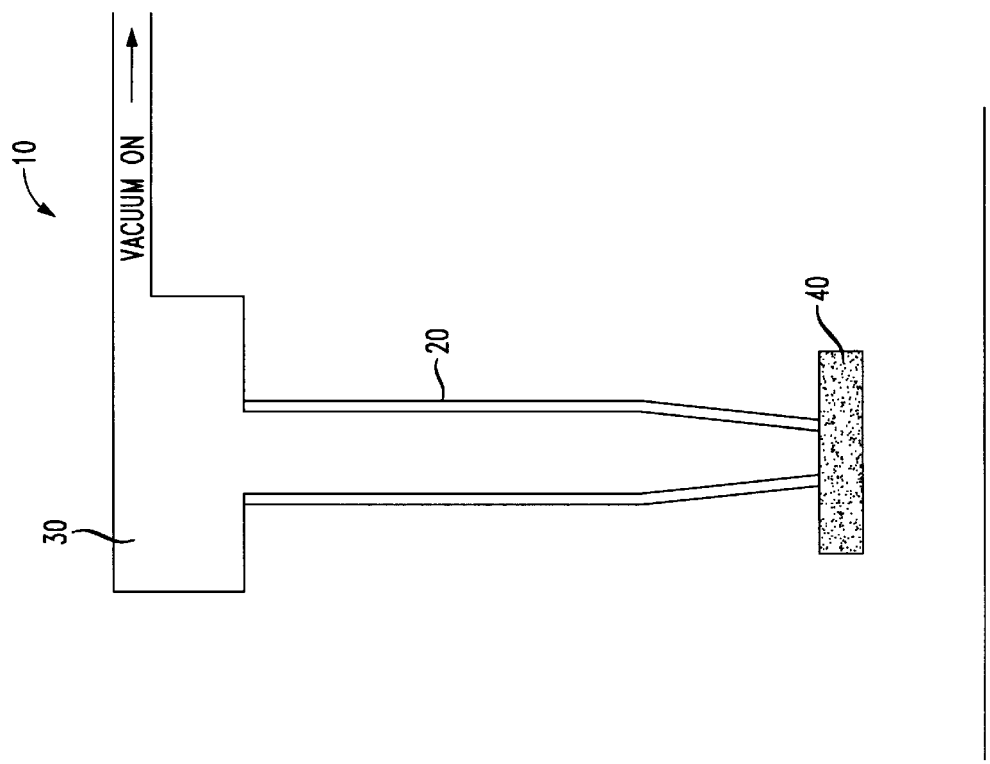
FIG. 1(b) shows the vacuum collet of FIG. 1(a) after picking up a laser component.
Figure 1A:
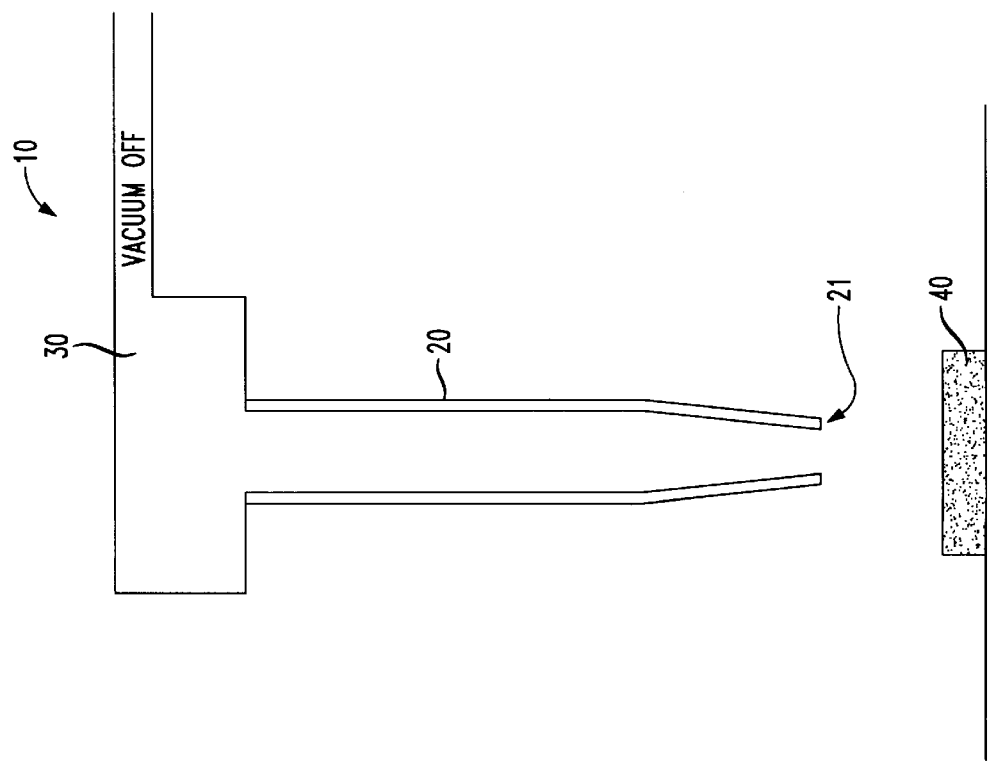
FIG. 1(a) shows a conventional vacuum collet prior to picking up a laser component.

Referring to FIGS. 2(a) and 2(b), there is shown a vacuum collet device 100 according to a first exemplary embodiment of the present invention. The collet device 100 includes a vacuum collet tube 110 with a first vacuum hole 113 and a first chamber or bore 114 coupled to the vacuum hole. The collet device 100 also includes second and third vacuum holes 115, 116 with second and third chambers or bores 117, 118 coupled respectively thereto. The first through third bores 114, 117, 118 are preferably passages of tubular shape with a circular cross-section, however, they may be formed in any suitable shape without departing from the scope of the invention. The second and third bores 117, 118 are coupled to the first bore 114 by openings 119 formed in the collet 110. The openings 119 are also preferably of tubular shape with circular cross section, however, they may be formed in any suitable shape without departing from the scope of the invention. The width of the openings 119 is such that air may flow through, but weights 130, 131 (described below) cannot pass into the bore 114. The collet 110 is coupled, at its top portion 111, to a vacuum source 120. The vacuum source 120 provides a vacuum to the collet 110 which draws components 140 toward a bottom face 112 of the collet. The collet 110 also includes weights 130, 131 disposed in each of the second and third bores 117, 118 of the collet for removing components 140 from the bottom face 112 of the collet 110. As shown in FIGS. 2(a) and 2(b), the weights 130, 131 are moved upward in the collet 110 when the vacuum is activated. In order for the weights 130, 131 to be lifted away from the component 140, there must be a pressure differential between the areas above and below the weights. This pressure differential can be accomplished by introducing openings 132, 133 at the bottom face of the collet 110. The width of the openings 132, 133 will determine the pressure differential and how far the weights 130, 131 are raised above the component 140 being handled. Shutting off the vacuum (i.e. equalizing the pressure differential) causes the weights 130, 131 to drop, and release the component 140. It should be noted that although the openings 132, 133 are disposed in the bottom face 112 of the collet 110 in the exemplary embodiment, they may be disposed at any position along the collet so that a pressure differential is created in the areas above and below the weights 130, 131. The weights 130, 131 may be made of metal, plastic or any other suitable material known to those skilled in the art. Although the weights 130, 131 are shown as being substantially spherical in FIGS. 2(a) and 2(b), they may be formed in any suitable shape which allows them to move within the second and third bores 117, 118. For example, utilizing tubular bores 117, 118 with circular cross-section, the weights 130, 131 could also be made in the shape of a cylinder. Alternately, if the bores 117, 118 were made tubular with a rectangular cross section, rectangular or square weights 130, 131 would work equally as well. There are many variations in the shape of the bores 117, 118 and the corresponding shape of the weights 130, 131 which are too numerous to mention here. These alternative shapes are also contemplated within the scope of the invention.

Preferably, the diameters of the vacuum holes 115, 116 and openings 119 of the collet 110 are less than the diameter of the weights 130, 131, so that the weights do not exit into the first bore 114 or out of the bottom face 112 of the collet 110 during operation. The weights 130, 131 are movable, by action of the vacuum source 120, between a position where they are completely encased inside the collet 110, and a position where a portion thereof extends outside the collet. FIG. 2(a) shows the vacuum activated and the weights retracted into the upper portion of the respective portions 117, 118, so that the component 140 is drawn against the bottom face 112 of the collet 110. FIG. 2(b) shows the collet 110 after the vacuum has been deactivated and the weights 130, 131 have fallen to the vacuum holes 115, 116 at the bottom of the respective portions 117, 118 of the collet 110. The operation of the vacuum collet device 100 is explained in more detail below.

When handling components 140 (e.g. laser bars, laser chips) using the collet device 100 according to the first exemplary embodiment of the present invention, the collet 110 is placed over the components to begin the process. In order to move the components 140 from one location to another, the vacuum source 120 is activated creating a vacuum at the bottom face 112 of the collet 110. This vacuum draws the components 140 toward the bottom face 112 of the collet 110 and retains them there. The activation of the vacuum also draws the weights 130, 131 upwardly in second and third bores 117, 118 towards the openings 119. The weights 130, 131 move up in the bores 117, 118 until they reach the top of the portions and are held there as long as the vacuum is activated. The entire collet device 100 is then moved (on a swing arm or similar device; not shown) to the position where the components 140 are to be placed. The vacuum source 120 is then deactivated, thereby restoring ambient pressure at the bottom face 112 of the collet 110.

As soon as the vacuum is deactivated, the weights 130, 131 move downwardly in the collet 110 (due to gravity) and contact the component 140, thereby forcing the component away from the bottom face 112 of the collet 110. The weights 130, 131 are made so that they are heavy enough to gently remove the components 140 from the bottom face 112 of the collet 110, but not so heavy so as to damage the components. Instead of the bores 114, 117, and 118, the vacuum collet may include a screen, which may be in the form of a plate, a mesh, or a frame, as described in detail below.

Figure 3A:
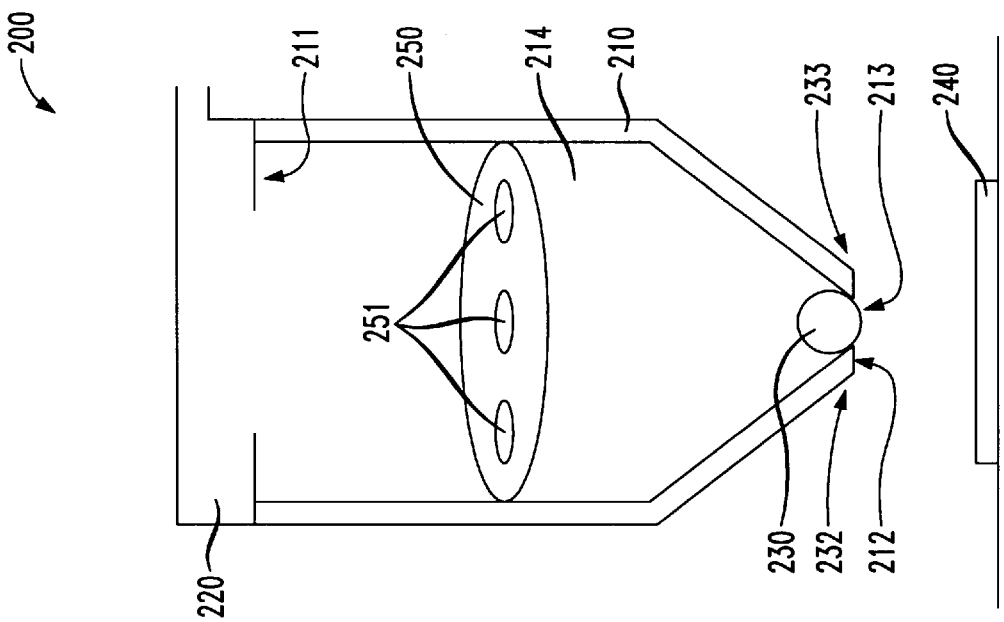
FIG. 3(a) shows a vacuum collet according to a second embodiment of the present invention with a laser component attached thereto.
Figure 3B:
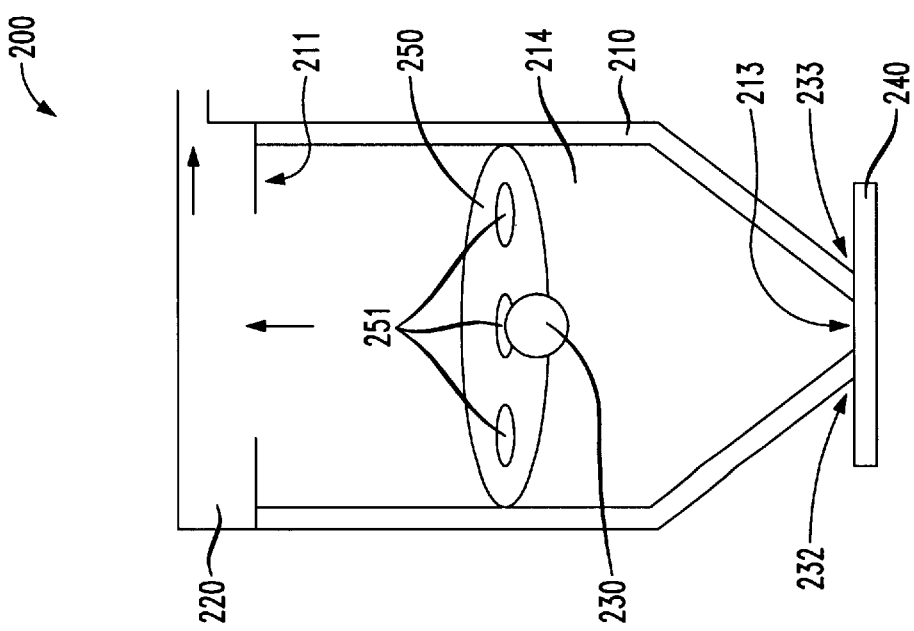
FIG. 3(b) shows the vacuum collet of FIG. 3(a) with the laser component being removed.
Figure 6B:
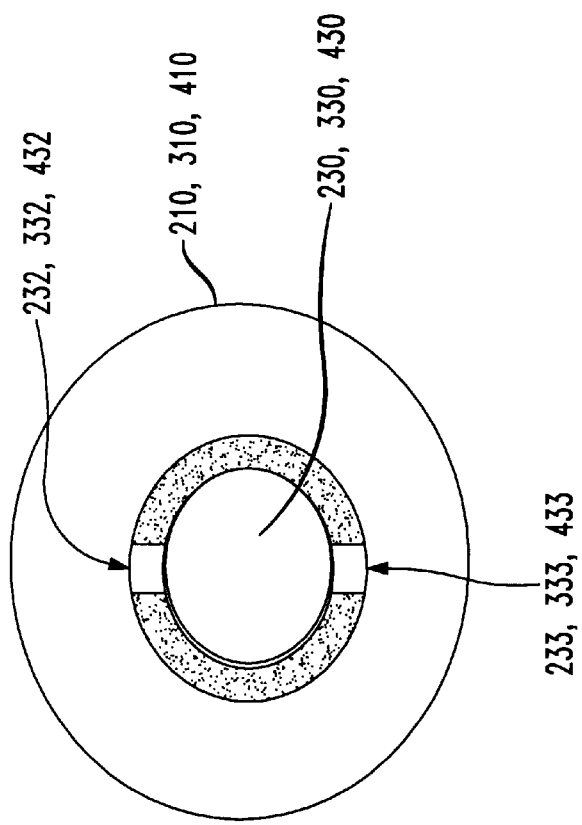
FIG. 6(b) is a bottom view of the vacuum collets shown in FIGS. 3(a)–5(b).
Figure 6A:
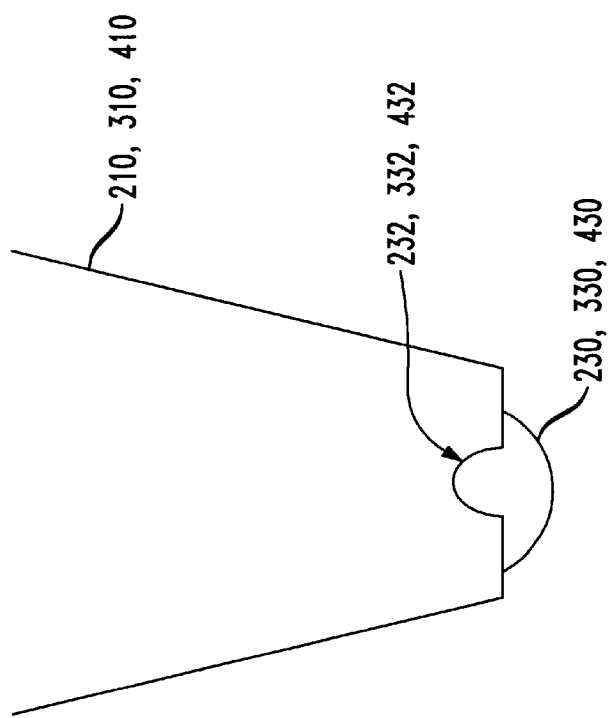
FIG. 6(a) shows a side elevation view of the vacuum collets shown in FIGS. 3(a)–5(b).

FIGS. 3(a) and 3(b) show a collet device 200 according to a second exemplary embodiment of the present invention. As opposed to the collet device 100 according to the first embodiment, the collet device 200 according to the second embodiment includes only one vacuum hole 213 and one bore 214 coupled to the vacuum hole. A single weight 230 is disposed in the bore 213 of the vacuum collet 210 for removing components 140 from the bottom face 212 of the collet. The collet 210 also includes notches 232, 233 for creating a pressure differential (see FIGS. 6(a) and 6(b)). The process for creating the pressure differential is explained above with reference to FIGS. 2(a) and 2(b) and elements 132, 133. The weight 230 is prevented from upward movement in the bore 214 by a plate 250. The plate 250 preferably extends across the entire diameter of the bore 214. The plate 250 includes a plurality of holes 251 which are of a diameter less then the diameter of the weight 230. The holes 251 allow air to pass through the plate 250, but prevent the weight from passing through. The plate 250 is preferably made of metal or plastic, but may be made of any suitable material without. departing from the scope of the invention. The collet 210 is coupled, at its top portion 211, to a vacuum source 220. The vacuum source 220 provides a vacuum to the collet 210 which draws components 240 toward a bottom face 212 of the collet. The vacuum also causes the weight 230 disposed in the collet 210 to move from a position in a lower portion of the collet to a position in an upper portion of the collet. FIG. 3(a) shows the weight 230 retracted and the vacuum activated, so that the component 240 adheres to the bottom face 212 of the collet 210. FIG. 3(b) shows the collet 210 after the vacuum has been deactivated and the weight 230 has fallen to the bottom of the collet 210. When the weight 230 is disposed in the lower portion of the collet 210, as shown in FIG. 3(b), the weight operates to remove the component 240 from the bottom face of the collet. In particular, when the vacuum is deactivated and the weight 230 falls towards the bottom face 212 of the collet 210, a portion thereof contacts the component 240 attached to the bottom face. The contact of the weight 230 with the component 240 forces the component away from the bottom face 212 of the collet 210.

FIGS. 4(a) and 4(b) show a collet device 300 according to third exemplary embodiment of the present invention. The collet device 300 is substantially similar to the collet device 200 shown in FIGS. 2(a) and 2(b), and like reference numerals indicate like elements. The collet device 300 preferably includes notches 332, 333 for creating a pressure differential (see FIGS. 6(a) and 6(b)). The collet device 300 differs from the collet device 200 in that it includes a wire mesh screen 350. The mesh 350 prevents the weight 330 from moving past it in the bore 314. The mesh may be formed of metal or plastic or any other suitable material known to those skilled in the art. The operation of the collet device 300 is substantially similar to the operation of the collet device 200. FIG. 4(a) shows the collet device 300 with the weight 330 retracted and the vacuum activated, so that the component 340 adheres to the bottom face 312 of the collet 310. FIG. 4(b) shows the collet device 300 after the vacuum has been deactivated and the weight 330 has fallen to the bottom of the collet 310.

Figure 5A:
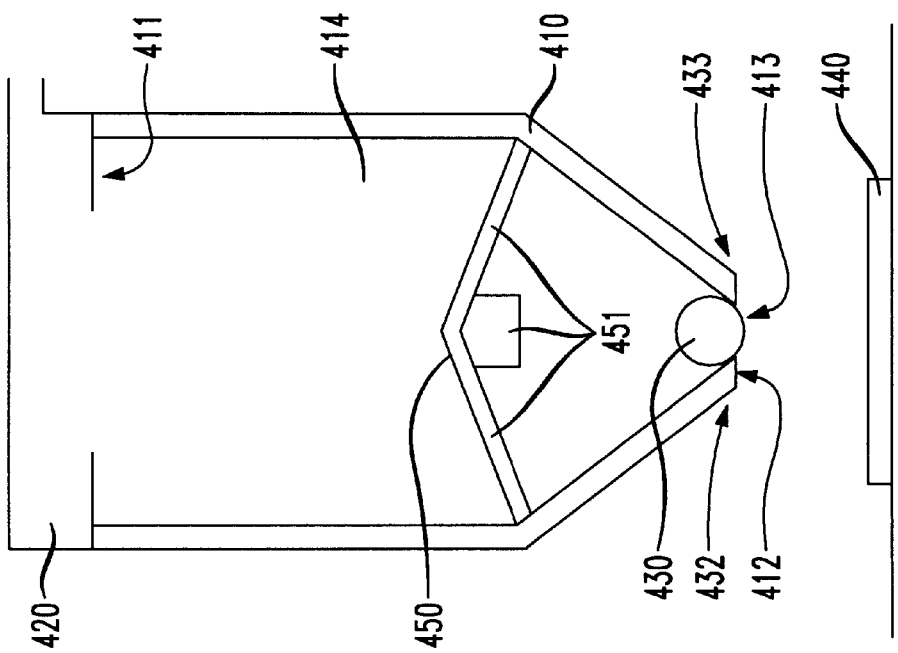
FIG. 5(a) shows a vacuum collet according to a fourth embodiment of the present invention with a laser component attached thereto.
Figure 5B:
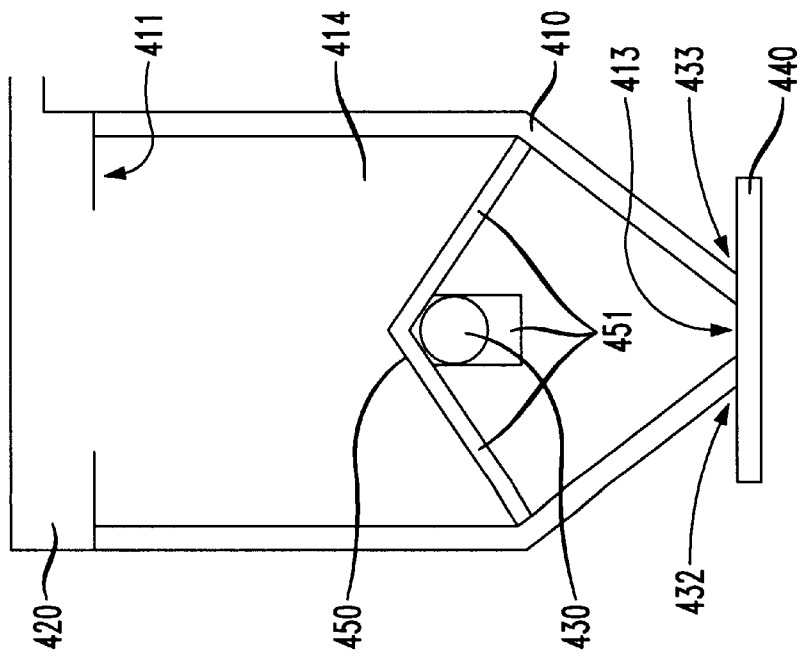
FIG. 5(b) shows the vacuum collet of FIG. 5(a) with the laser component being removed.

FIGS. 5(a) and 5(b) show a collet device 400 according to fourth exemplary embodiment of the present invention. The collet device 400 is substantially similar to the collet device 200 shown in FIGS. 2(a) and 2(b), and like reference numerals indicate like elements. The collet device 400 preferably includes notches 432, 433 for creating a pressure differential (see FIGS. 6(a) and 6(b)). The collet device 400 differs from the collet device 200 in that it includes a frame which may be in the form of a tripod 450. The frame 450 prevents the weight 430 from moving past the frame in the bore 414. The exemplary tripod frame 450 includes three legs which may be substantially identical. The legs 451 protrude into the center of the bore 414 of the collet 410 where they are coupled to one another. The legs 451 of the frame are made wide enough (or spaced sufficiently close together) so that the weight 430 cannot pass through spaces between the legs. The frame 450 may be formed by metal or plastic or any other suitable material known to those skilled in the art. The operation of the collet device 400 is substantially similar to the operation of the collet device 200. FIG. 5(a) shows the collet device 400 with the weight 430 retracted and the vacuum activated, so that the component 440 adheres to the bottom face 412 of the collet 410. FIG. 5(b) shows the collet device 400 after the vacuum has been deactivated and the weight 430 have fallen to the bottom of the collet 410. Although the exemplary frame is a tripod, a frame according to the invention may include any desired number of legs, so long as the openings between legs are sufficiently small to retain the weights 430.

Although the weights 230, 330, 430 are shown as being substantially spherical in the second through fourth embodiments, the weights may be formed in any suitable shape which allows movement of the weights within the respective bores 214, 314, 414. Additionally, although the bores 214, 314, 414 are shown in the second through fourth embodiments as being substantially tubular, the portions may be formed in any suitable shape which allows movement of the weights 230, 330, 430 therein.

Thus, the exemplary embodiments of the present invention provides a vacuum collet device which removes components easily and efficiently. The vacuum collet performs the removal without the need for operator assistance, or complex gas puff equipment. Additionally, the exemplary vacuum collet may be controlled by automated control signals, thereby streamlining the process of producing and transferring components.

Although the invention has been described in terms of exemplary embodiments, it is not limited thereto. Rather, the appended claims should be construed broadly, to include other variants and embodiments of the invention which may be made by those skilled in the art without departing from the scope and range of equivalents of the invention.

What is claimed is:

1. An apparatus for handling electronic components comprising:
   a vacuum member with at least one vacuum hole disposed therein;
   at least one weight disposed within said vacuum member, said weight being movable within the vacuum member to remove electronic components from the vacuum member; and,
   a screen disposed with the vacuum member, said screen preventing the weight from escaping the vacuum member.

2. The apparatus of claim 1, wherein the at least one weight comprises a substantially spherical weight.

3. The apparatus of claim 2, wherein the vacuum member is a vacuum collet.

4. The apparatus of claim 3, wherein the vacuum collet is tubular in shape and the at least one spherical weight lies within a bore in the collet.

5. The apparatus of claim 2, wherein the substantially spherical weight is disposed in a concentric relationship with the at least one hole in the vacuum member.

6. The apparatus of claim 5, wherein the weight is movable from a position in a lower portion of the vacuum member to a position in an upper portion of the vacuum member while the vacuum is turned on.

7. The apparatus of claim 6, wherein the weight moves from the upper portion of the vacuum member to the lower portion of the vacuum member and extends therefrom when the vacuum is turned off.

8. The apparatus of claim 1, wherein the electronic components comprise laser bars.

9. The apparatus of claim 1, wherein the screen comprises a wire mesh which extends across the interior of the vacuum member.

10. An apparatus for handling electronic components comprising:
    a vacuum member with at least one vacuum hole disposed therein;
    at least one weight disposed within said vacuum member, said weight being movable within the vacuum member to remove electronic components from the vacuum member; and,
    a disk with a plurality of holes formed therein.

11. An apparatus for handling electronic components comprising:
    a vacuum member with at least one vacuum hole disposed therein;
    at least one weight disposed within said vacuum member, said weight being movable within the vacuum member to remove electronic components from the vacuum member; and,
    a cage, the legs of the cage extending from inner sidewalls of the vacuum member towards the center of the vacuum member.

12. A method for handling electronic components comprising the steps of:
    activating a vacuum member to attract an electronic component thereto and to move a weight upwards in the vacuum member;
    deactivating the vacuum member to release the electronic component and to move the weight downward in the vacuum member and into contact with the electronic component; and,
    providing a screen within the vacuum member for preventing the weight from escaping the vacuum chamber.

13. The method of claim 12, wherein the weight is a substantially spherical weight.

14. The method of claim 12, comprising the further step of:
    approaching the electronic component with the vacuum member before activating the vacuum member; and,
    moving the vacuum member away from the electronic component after deactivating the vacuum member.

15. The method of claim 12, wherein the electronic components comprise laser bars.

16. A vacuum collet for handling electronic components comprising:
- a vacuum member having at least one vacuum hole disposed therein;
- a respective weight disposed within the at least one vacuum hole of the vacuum member, said weight being movable within the vacuum hole to remove electronic components from the vacuum member; and, a screen disposed within the vacuum member, said screen preventing the weight from escaping the vacuum member.

17. The vacuum collet of claim 16, wherein the weight is a substantially spherical weight.

18. An apparatus for handling electronic components comprising:
- a vacuum member with at least one vacuum hole disposed therein;
- at least one weight disposed within said vacuum member, said weight being movable within the vacuum member to remove electronic components from the vacuum member; and,
- a screen means for preventing the weight from escaping the vacuum member.

* * * * *